(12) United States Patent
Kumar

(10) Patent No.: US 6,952,617 B1
(45) Date of Patent: Oct. 4, 2005

(54) HANDHELD COMPUTER WITH DETACHABLE HANDSET

(75) Inventor: Rajendra Kumar, Akron, OH (US)

(73) Assignee: Khyber Technologies Corporation, Akron, OH (US)

( * ) Notice: Subject to any disclaimer, the term of this patent is extended or adjusted under 35 U.S.C. 154(b) by 366 days.

(21) Appl. No.: 09/787,472

(22) PCT Filed: Jul. 17, 2000

(86) PCT No.: PCT/US00/19445

§ 371 (c)(1),
(2), (4) Date: Mar. 15, 2001

(87) PCT Pub. No.: WO01/06344

PCT Pub. Date: Jan. 25, 2001

Related U.S. Application Data

(60) Provisional application No. 60/143,861, filed on Jul. 15, 1999.

(51) Int. Cl.[7] ............................................. G05B 11/01
(52) U.S. Cl. .............................. 700/1; 700/17; 700/19
(58) Field of Search ............................ 700/17, 1, 19; 455/556.1, 556.2, 557, 558, 563, 575.1, 575.2, 455/575.6, 90.3, 550, 573, 556; 379/110.01

(56) References Cited

U.S. PATENT DOCUMENTS

| | | | | |
|---|---|---|---|---|
| 5,491,507 A | * | 2/1996 | Umezawa et al. | 348/14.02 |
| 5,606,594 A | * | 2/1997 | Register et al. | 455/556.2 |
| 5,625,673 A | * | 4/1997 | Grewe et al. | 455/556.2 |
| 5,633,920 A | * | 5/1997 | Kikinis et al. | 379/130 |
| 5,924,044 A | * | 7/1999 | Vannatta et al. | 455/556.1 |
| 5,974,334 A | * | 10/1999 | Jones, Jr. | 455/556.2 |
| 6,122,526 A | * | 9/2000 | Parulski et al. | 455/556.1 |
| 6,188,917 B1 | * | 2/2001 | Laureanti | 455/573 |
| 6,266,539 B1 | * | 7/2001 | Pardo | 455/556.2 |
| 6,269,259 B1 | * | 7/2001 | Lai | 455/569.1 |
| 6,278,884 B1 | * | 8/2001 | Kim | 455/556.1 |
| 6,374,090 B1 | * | 4/2002 | Morales | 455/90.1 |
| 6,427,078 B1 | * | 7/2002 | Wilska et al. | 455/550.1 |

(Continued)

FOREIGN PATENT DOCUMENTS

| | | | | |
|---|---|---|---|---|
| JP | 0930770 | * | 7/1999 | H04N 1/00 |
| WO | WO 85/04301 | * | 9/1985 | H04M 1/05 |

*Primary Examiner*—Anthony Knight
*Assistant Examiner*—Ronald D Hartman, Jr.
(74) *Attorney, Agent, or Firm*—Hahn Loeser + Parks LLP

(57) ABSTRACT

A handheld computing device (10) having voice input and voice output includes a handheld unit (20) having a processor (11) and a display (18) communicating with the processor (11), a handset (30) including means for voice input (43) and means for voice output (42), a mechanism (39, 41) for docking the handset (30) with the handheld unit (20) forming a docked unit, the docked unit dimensioned to be held in one hand while being used for voice input and voice output, and at least one connection (23, 36) for carrying voice-representative signals between the handheld unit (20) and the handset (30). Device (10) allows telephone-style, voice-driven, user-interface communications both when handset (30) is docked with handheld unit (20), and when handset (30) is detached from handheld unit (20). Handset (30) is made lightweight so that it can be held for an extended amount of time during lengthy phone-style conversations, and may be equipped with a formed support such as a flexible loop (26) to let the user wear handset (30) on one of user's ears for hands-free use as a handset. Device (10) can also be equipped with an image scanner to serve as a digital camera or videophone.

26 Claims, 5 Drawing Sheets

U.S. PATENT DOCUMENTS

| | | | |
|---|---|---|---|
| 6,516,202 B1 * | 2/2003 | Hawkins et al. | 455/556.2 |
| 6,647,103 B2 * | 11/2003 | Pinard et al. | 379/110.01 |
| 2002/0173344 A1 * | 11/2002 | Cupps et al. | 455/566 |
| 2003/0050011 A1 * | 3/2003 | Palermo et al. | 455/41 |
| 2003/0123627 A1 * | 7/2003 | Pinard et al. | 379/110.01 |
| 2003/0209604 A1 * | 11/2003 | Harrison, Jr. | 235/462.44 |

* cited by examiner

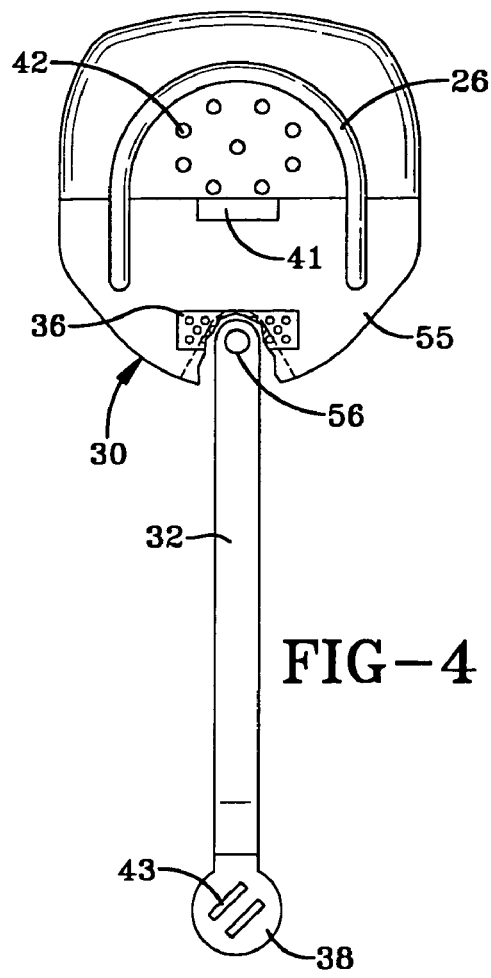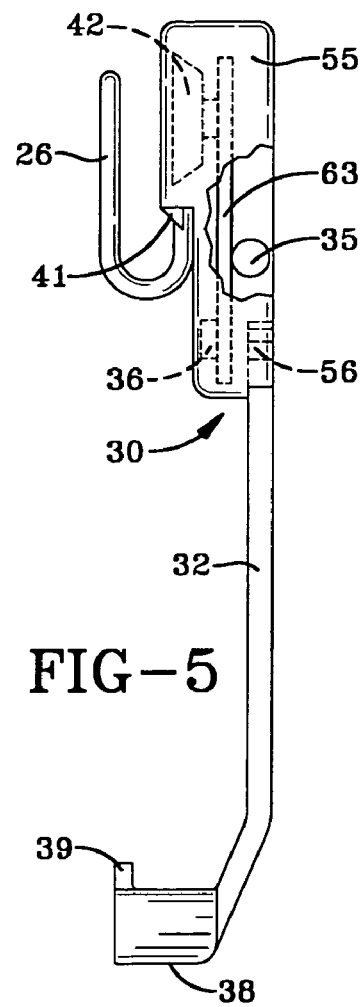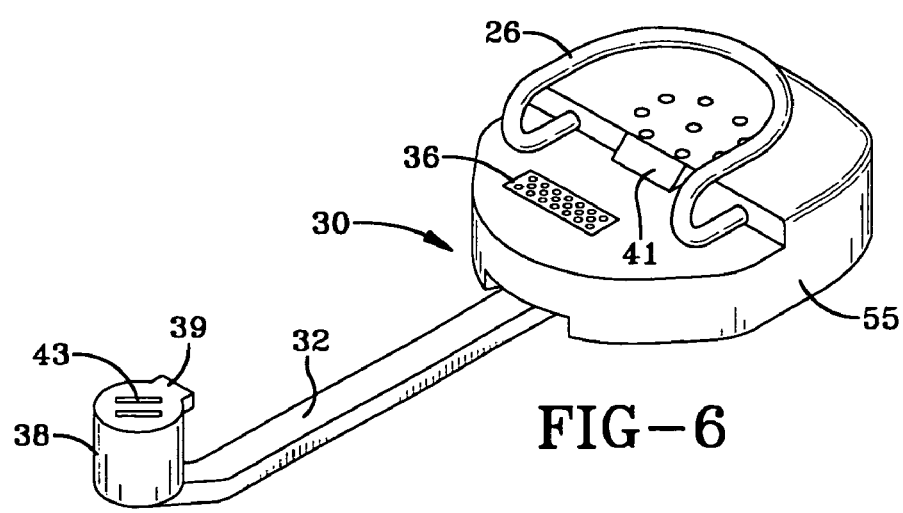

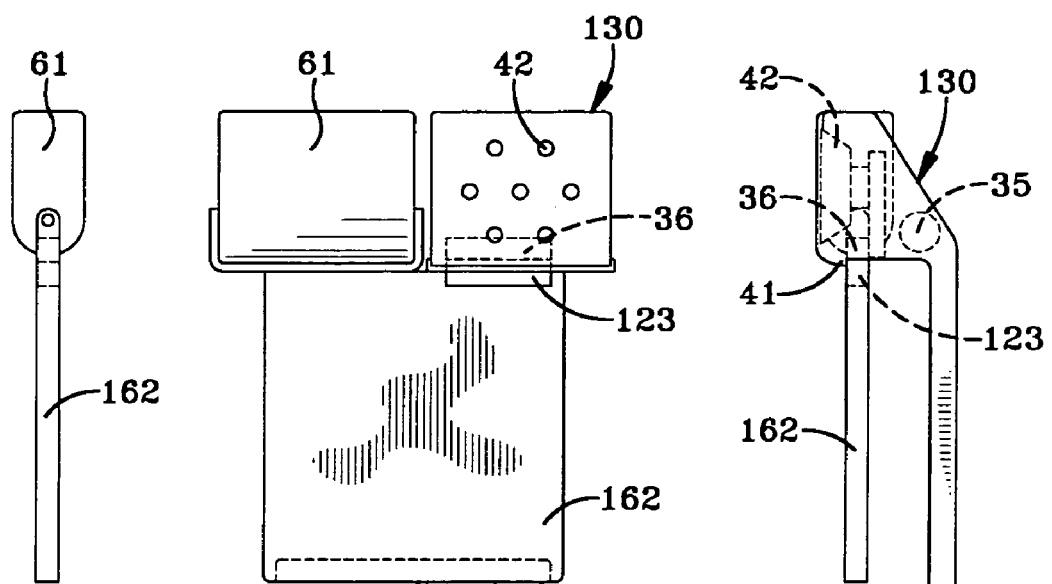
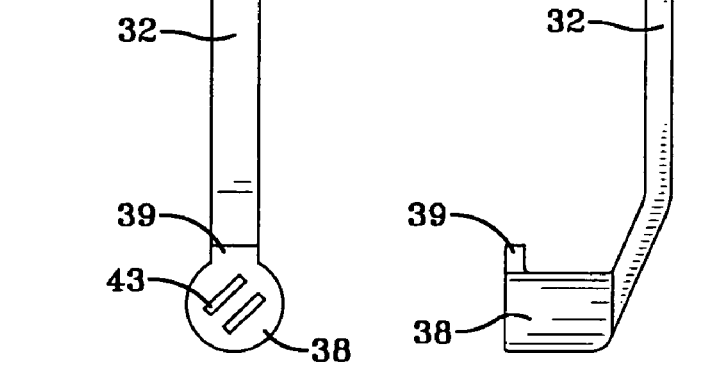
FIG-11  FIG-10  FIG-12

HANDHELD COMPUTER WITH DETACHABLE HANDSET

This application claims benefit of Ser. No. 60/143,861 filed Jul. 15, 1999.

TECHNICAL FIELD

The present invention relates in general to handheld computer and communications devices. More particularly, the present invention pertains to cellular telephones and electronic organizers. More specifically, the present invention relates to portable devices sometimes referred to as smart cell phones, that combine the functions furnished by cellular telephones and electronic organizers.

BACKGROUND ART

Smart cell phones are devices that combine the capabilities of cellular telephones and electronic organizers. Examples of such devices are the Model PDQ-800 from Qualcomm Incorporated of San Diego, Calif., and the Model R380 from Telefonaktiebolaget LM Ericsson of Stockholm, Sweden. These devices allow the user to access the Internet for email, stocks quote, etc., while preserving their use as simple wireless phone units. However, users find these devices too bulky and heavy when they have to be held for a prolonged period of time during lengthy phone conversations. Also, users cannot read information on the display of these devices while carrying out a phone conversation unless the device is used in a so-called speakerphone operating mode, which is not suitable for use in public places such as airports and street sidewalks.

This latter shortcoming is partially addressed by Motorola, Inc. of Schaumburg, Ill., which makes a Model StarTAC Clip-on Organizer that clips onto the back of Motorola's Model StarTAC cellular telephone. When combined, the cell phone can automatically dial a user selected telephone number stored in contact database of the organizer. If the organizer is detached from the cell phone, the organizer display can be read while the user carries out telephone conversation via the handset.

However, the combined Motorola StarTAC Clip-on Organizer and cellular telephone still suffers from several significant drawbacks. First, since the organizer and telephone must, for the most part, operate independent of each other, they must each include a separate battery power supply that the user must separately charge. Second, because the organizer and telephone each must be equipped with sufficient computing power to operate independent of the other, the overall cost of the combined device becomes prohibitive. Additionally, neither of these devices provide an integral handset that can be worn by the user for hands-free operation.

SUMMARY OF THE INVENTION

It is, therefore, an object of the present invention to provide a handheld computer and communication device having a detachable handset that by sharing processor resources is economical to manufacture.

It is another object of the present invention to provide a device, as set forth above, wherein the handset may be worn by the user for hands-free operation.

It is still another object of the present invention to provide a device, as set forth above, which is adapted to handheld and/or worn for extended periods without user fatigue resulting from the device's weight or dimensions.

It is still a further object of the present invention to provide a device, as set forth above, having a plurality of rechargeable power supplies that may be simultaneously recharged through a single connection with the device.

It is an additional object of the present invention to provide a device, as set forth above, and further including a display, that allows a user to read the display while holding the handset to, or wearing the handset upon, an ear.

These and other objects and advantages of the present invention over existing prior art forms will become more apparent and fully understood from the following description in conjunction with the accompanying drawings.

In general, a handheld computing device having voice input and voice output includes a handheld unit having a processor and a display communicating with the processor, a handset including means for voice input and means for voice output, a mechanism for docking the handset with the handheld unit forming a docked unit, the docked unit dimensioned to be held in one hand while being used for voice input and voice output, and at least one connection for carrying voice-representative signals between the handheld unit and the handset.

A wireless phone handset for handheld and hands-free operation includes a handheld unit having means for communicating with remote locations, a headset having a microphone for voice input and a speaker for voice output, a mechanism for docking the handset with the handheld unit forming a docked unit, the docked unit dimensioned to be held in one hand while being used for voice input and voice output, and at least one connection for carrying voice-representative signals between the handheld unit and the headset, both when the headset is docked with the handheld unit and when the headset is separate from the handheld unit.

A handheld computing and communication device includes a handheld unit having a processor and a display communicating with the processor, a card-shaped peripheral that communicates with remote locations, the handheld unit having a slot for accepting the card-shaped peripheral, a handset including means for voice input and means for voice output, a mechanism for docking the handset with the handheld unit forming a docked unit, the docked unit dimensioned to be held in one hand while being used for voice input and voice output, at least one connection for carrying voice-representative signals between the handheld unit and the headset, both when the headset is docked with the handheld unit and when the headset is separate from the handheld unit, and the card-shaped peripheral carrying at least one of the connection for carrying voice-representative signals and the mechanism for docking the handset to the handheld unit.

A handset adapted to be removably attached to a handheld host computer of the type having connection for peripherals, the handset including a microphone for voice input and a speaker for voice output, a mechanism for docking the handset with the handheld unit forming a docked unit, the docked unit dimensioned to be held in one hand while being used for voice input and voice output, and at least one connection for carrying voice-representative signals between the handheld unit and the headset, both when the headset is docked with the handheld unit and when the headset is separate from the handheld unit.

BRIEF DESCRIPTION OF THE DRAWINGS

FIG. 4 is a front plan view of the exemplary detachable handset shown in FIG. 1.

FIG. 5 is a right side view of the exemplary detachable handset shown in FIG. 1.

FIG. 6 is a perspective view of the exemplary detachable handset shown in FIG. 1.

FIG. 10 is a front plan view of the exemplary detachable handset, image scanner and card-shaped peripheral shown in FIG. 8.

FIG. 11 is a left side view of the exemplary image scanner and card-shaped peripheral shown in FIG. 10.

FIG. 12 is a right side view of the exemplary detachable handset, image scanner and card-shaped peripheral shown in FIG. 10.

PREFERRED EMBODIMENT FOR CARRYING OUT THE INVENTION

Figure 1:
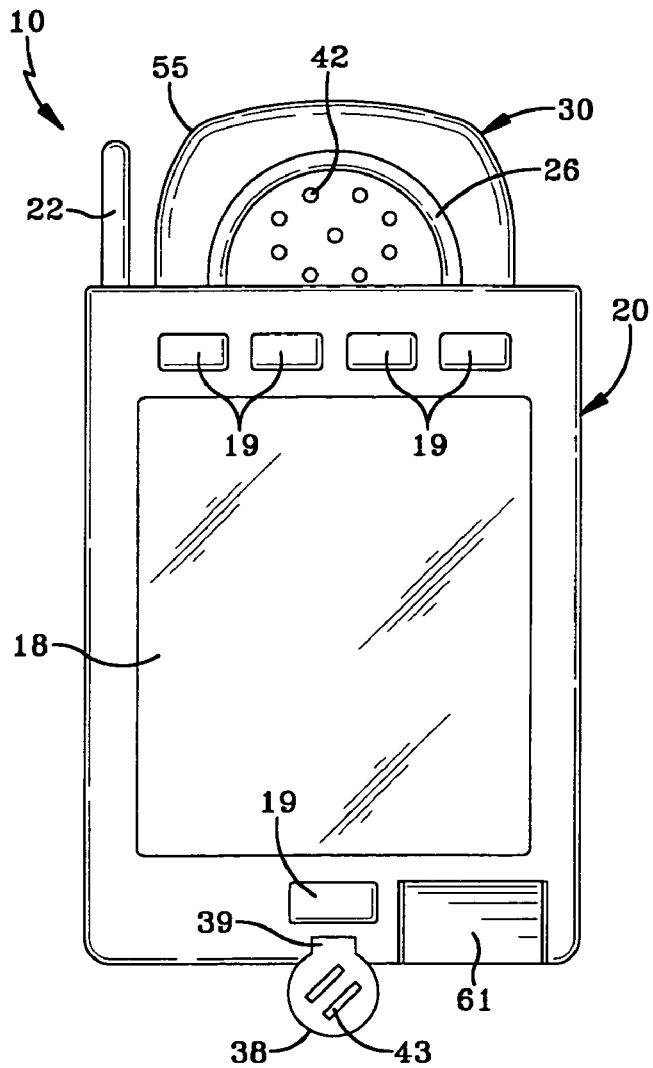
FIG. 1 is a front plan view of an exemplary device in accordance with the present invention showing both a portable, handheld unit and a detachable handset.

FIG. 1 presents a front plan view of an exemplary device in accordance with the present invention, generally indicated by the numeral 10, that is a handheld computer 20 (hereinafter referred to as handheld unit 20) into which is removably docked a detachable handset 30, operable both when attached and detached from handheld computer 20.

Device 10 may employ a voice-driven user-interface and include a processor, memory and other support circuits, as well as display and keys for user-interface. Handset 30 has a microphone, speaker, and a short-range communication link to carry voice-representative signals between handset 30 and handheld unit 20. Device 10 allows telephone-style, voice-driven, user-interface both when handset 30 is docked into handheld unit 20, and when handset 30 is detached from handheld unit 20.

Handset 30 is made lightweight so that it can be held for an extended amount of time during lengthy phone-style conversations. To further aid in such applications, handset 30 may be equipped with a formed support to let the user wear handset 30 on one of user's ears for hands-free use as a headset. A flexible loop that fits around base of the user's ear is one example of such formed support.

Device 10 can also be equipped with an image scanner to serve as a digital camera. The image scanner can be attached to handheld unit 20 via an adjustable joint so that the scanned image scanner can be pointed in multiple directions with respect to handheld unit 20. The scanned images are received by the processor of handheld unit 20 and stored in memory. From there the image can be output to a printer or sent to a remote device for archiving. Alternately, the scanner can be used to convert device 10 into a videophone.

In this operating mode device 10 may transmit the scanned video images to a remote site where they are displayed in real time.

In an alternate embodiment, the functionality of the above-described handset 30 can be added as a peripheral to a handheld host computer of the type having connection for peripherals. This alternate embodiment will include a handset and means for connecting the handset to the handheld host computer, and optionally also may be equipped with an image scanner, thereby providing videophone capability.

Figure 2:
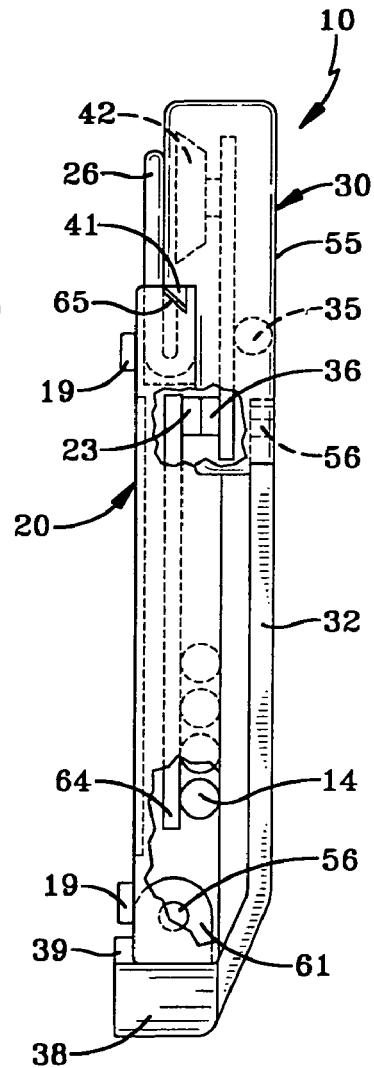
FIG. 2 is a right side view of the exemplary device shown in FIG. 1.
Figure 3:
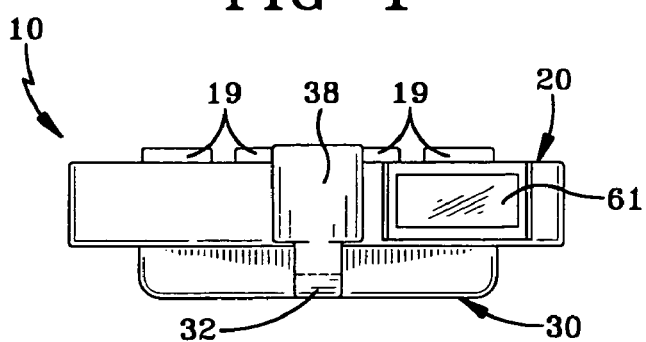
FIG. 3 is a bottom view of the exemplary device shown in FIG. 1.
Figure 7:
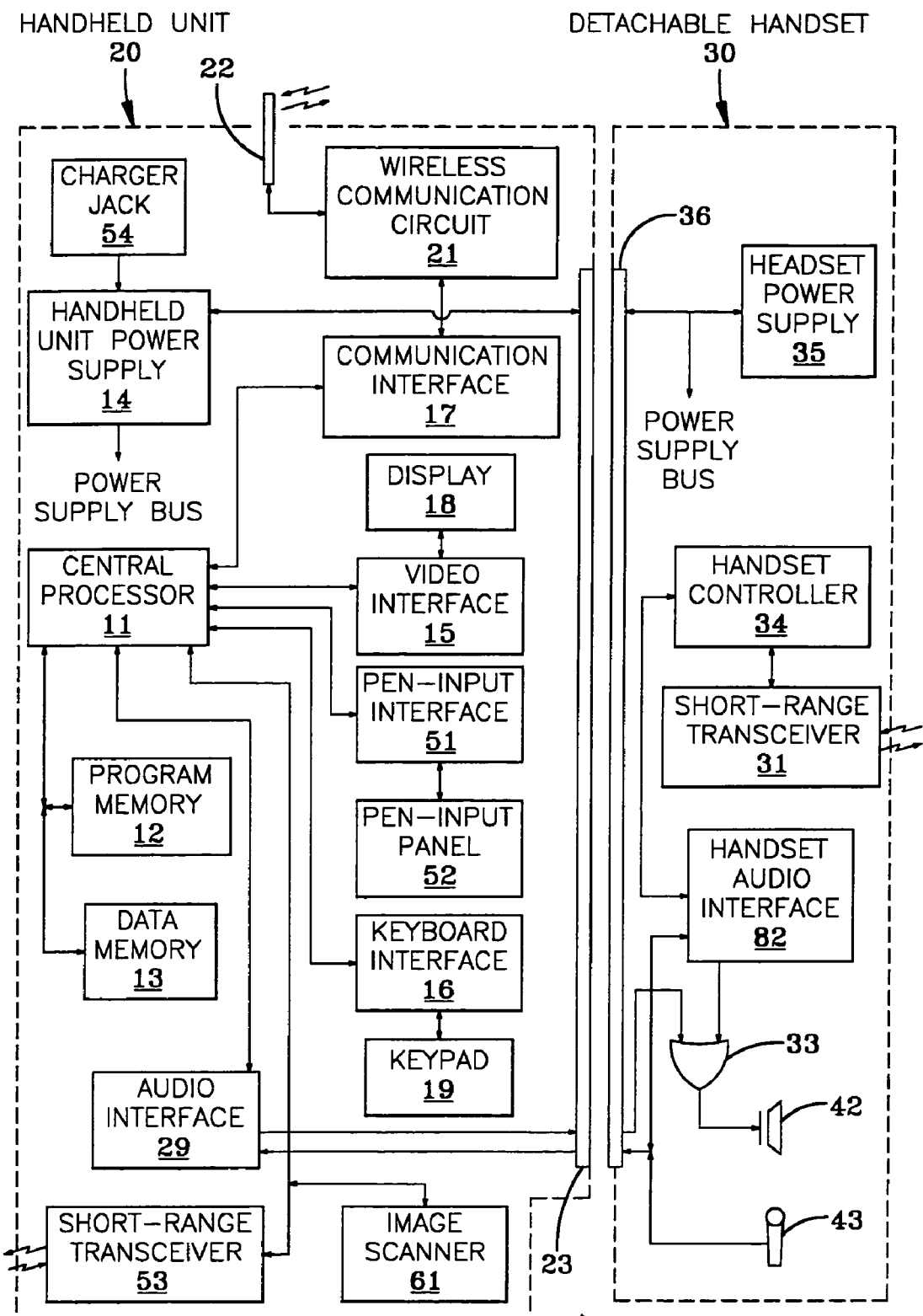
FIG. 7 is a block diagram of the exemplary device shown in FIG. 1.

FIGS. 2, 3 and 7 depict a right side view, bottom view and block diagram, respectively, of the embodiment of device 10 shown in FIG. 1. FIGS. 4, 5 and 6 show a front plan view, right-side view, and perspective view, respectively, of the embodiment of handset 30 presented in FIGS. 1–3.

Handheld unit 20 includes a display 18, tactile buttons 19 (which may be formed in a keypad), printed circuit board 64, a source of power such as power supply 14, and a connector 23 for connecting peripherals on the rear of the handheld unit 20. Detachable handset 30 includes housing 55, microphone housing 38 and a connecting arm 32. Housing 55 carries printed circuit board 63, speaker 42, a source of power such as power supply 35, and a connector 36 that mates with connector 23 of handheld unit 20 when handset 30 is docked into handheld unit 20. In the docked position, handset 30 is held to handheld unit 20 via a docking mechanism such as latching tabs 39 and 41 (best seen in FIG. 6) and their engaging members. Microphone housing 38 houses microphone 43 and has a tab 39 to latch handset 30 to handheld unit 20 when the former is docked into the latter, forming what may be referred to as a docked unit. In this way, while device 10 is can be held in one hand, the speaker and the microphone of handset 30 are positioned suitably for voice input and voice output.

Handset 30 also includes a flexible loop 26 that is formed in such a way that in its natural position there is a gap between loop 26 and housing 55 large enough for a user's upper-ar to pass though. To wear handset 30, for a hands-free operation of voice input and voice output, the user places handset 30 such that loop 26 goes around the base of the user's ear. In this position speaker 42 is placed substantially over the user's ear canal opening. Arm 32 is affixed to housing 55 via a hinge 56 such that the user can adjust arm 32 to place microphone 43 near the user's mouth. When handset 30 is docked into handheld unit 20, flexible loop 26 is pressed toward housing 55 by the back side of handheld unit 20 until tab 41 of handset 30 latches into a corresponding slot 65 in handheld unit 20.

Handset 30 is detached from handheld unit 20 by the user simply pushing the front of housing 55 away from handheld unit 20, thereby flexing arm 32 and allowing tab 41 to slip out of its slot. At this time flexible loop 26 pushes housing 55 away from the back-side of handheld unit 20, further facilitating detachment of handset 30 from handheld unit 20.

FIG. 7 shows a block diagram representation of device 10, including handheld unit 20 and handset 30. Handheld unit 20 includes a central processor 11, and the circuits supported and controlled by it, including program memory 12, data memory 13, power supply 14, video interface 15, keyboard interface 16, communication interface 17, pen-input interface 51 and audio interface 29. In turn, video interface 15 drives display 18, keyboard interface 16 drives keypad 19, communication interface 17 drives wireless communication circuit 21, and pen-input interface 51 drives the pen-input panel 52.

When handset 30 is docked into handheld unit 20, central processor 11 establishes a connection via the audio interface 29 that drives audio signals via connector 23 of handheld unit 20, which mates with connector 36 of handset 30, thereby driving microphone 43 and speaker 42 housed in handset 30. When handset 30 is detached from handheld unit 20, a connection is established via short-range transceiver 53 of handheld unit 20 and wireless, short-range transceiver 31 of handset 30.

Handset 30 includes a control circuit such as handset controller 34, and wireless, short-range transceiver 31 driven by handset controller 34. An OR gate 33 in handset 30 feeds to speaker 42 the audio signal from handset audio interface 82 and the audio signal from audio interface 29 of handheld unit 20. Similarly, the audio signal from microphone 43 of handset 30 is received by handset audio interface 82, from which it is communicated by handset controller 34 to short-range transceiver 31 of handset 30. In this way there is a connection made for carrying voice-representative signals between handheld unit 20 and handset 30 in both operating modes, namely when the handset is docked into handheld unit 20 and when the handset is detached from handheld unit 20.

Handheld unit 20 is powered by power supply 14 such as rechargeable Lithium Ion battery cells used in cellular phones. A charger (not shown) is plugged into charger jack 54 of handheld unit 20 to charge battery power supply 14 of handheld unit 20. When handset 30 is docked into handheld unit 20, headset power supply 35 is connected to handheld unit 20 power supply 14, whereby the former is trickle charged by the latter. In this way the user charges only the handheld unit 20 battery power supply 14 and headset battery power supply 35 is practically maintenance-free.

Handheld unit 20 includes, as seen in FIGS. 1–3, an image scanner 61 that is mounted to handheld unit 20 via a hinge 56, thereby allowing scanner 61 to be rotated to the desired angle. Image scanner 61 can include a CCD sensor such as those used in digital cameras. In this way, for example, when image scanner 61 is pointed toward the front of device 10, it faces the user and allows device 10 to be used as a video phone. In this operating mode the volume of the audio signal to speaker 42 may be increased so that device 10 can be used as a speakerphone.

Handheld unit 20 includes wireless communication circuit 21 attached to antenna 22. Wireless communication circuit 21 can be a cellular telephone circuit such as that offered by DSP Communications, Inc. of Cupertino, Calif., or it can be a satellite communication circuit such as that provided for Iridium by Motorola, Inc. of Schaumburg, Ill. Alternately, handheld unit 20 may include a wired communication circuit such as a traditional telephone modem.

Figure 8:
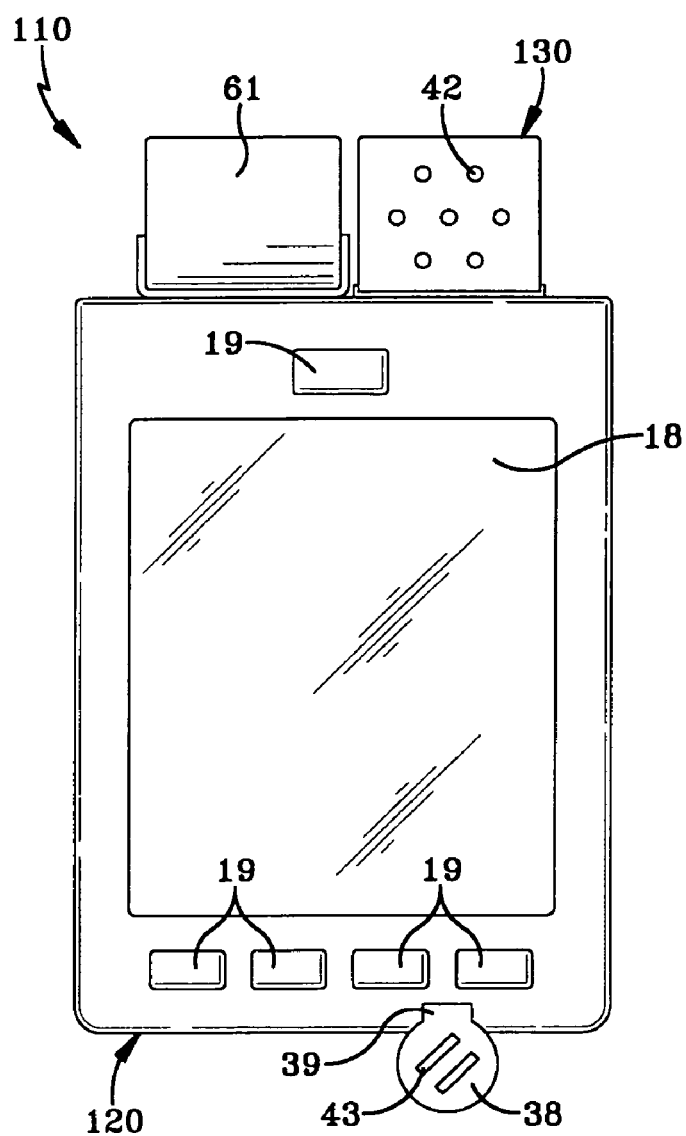
FIG. 8 is a front plan view of another exemplary device in accordance with the present invention showing both another portable, handheld unit and another detachable handset in which the wireless communication circuit is in a separate, card-shaped peripheral interposed therebetween.
Figure 9:
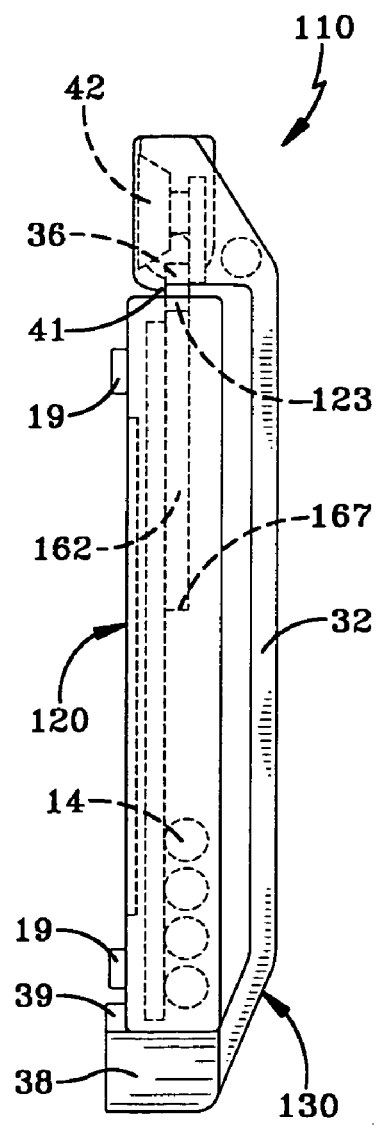
FIG. 9 is a right side view of the exemplary device shown in FIG. 8.

FIGS. 8–12 present another exemplary embodiment of a device in accordance with the present invention, identified generally with the numeral 110. As with device 10, device 110 includes a handheld unit 120 and handset 130. However, in this embodiment the wireless communication circuit is not included with handheld unit 120. Instead, wireless communications may be provided by a separate unit interposed between handheld unit 120 and handset 130, such as one of the wireless communication circuits for cellular telephony or other remote communications offered for sale by DSP Communications, Inc. of Cupertino, Calif., provided in a card-shaped housing. In this embodiment handheld unit 120 is provided with a slot 167 (shown in FIG. 9) for receiving a card-shaped peripheral 162 including a wireless communication circuit and having a connector 168 (illustrated in FIG. 10) for engagement with handheld unit 120. As shown in FIGS. 8 and 9, handset 130 docks into handheld unit 120. Handset 130 is configured similar to that of handset 30 described above, except handset 130 does not have a flexible loop 26. As shown in FIGS. 10 and 12, the opposite edge of card-shaped peripheral 162 includes a connector 123 that mates with connector 36 in handset 130, thereby interconnecting handheld unit 120 and handset 130 via card-shaped peripheral 162.

Handset 130, when combined with card-shaped peripheral 162, transforms a general purpose handheld computing device, such as a Palm-sized PC called Jornada from Hewlett-Packard Company of Palo Alto Calif., into a handheld computing device with a detachable handset.

The embodiment shown in FIGS. 8–12 also includes an image scanner 61 similar to that described above in reference to handheld unit 20 shown in FIGS. 1–3. FIG. 11 presents the left side view of card-shaped peripheral 162. FIG. 12 shows a right side view of handset 130 while it is connected to card-shaped peripheral 162.

Other modifications now should be apparent to the ordinarily skilled artisan. For example, card-shaped peripheral 162 may be replaced by a conventionally connected module mounted on handheld unit 120. Also, handset 130 may include a formed support, such as that described above for handset 30 and shown in FIGS. 1–6.

Inasmuch as the present invention is subject to variations, modifications and changes in detail, some of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art relating to devices for handheld computer and communications devices, and, in particular, smart cell phones.

What is claimed is:

1. A handheld device, comprising:
   a handheld unit including a processor and a display communicating with said processor, and having a voice-driven interface;
   a handset including voice input and voice output, and a wireless communication system;
   a mechanism for docking said handset with said handheld unit forming a docked unit, said docked unit dimensioned to be held in one hand while being used for voice input and voice output; and
   wherein voice-representative signals between said voice-driven interface of said handheld unit and said handset are communicated wirelessly.

2. The device, as set forth in claim 1, wherein a connection for carrying voice representative signals to said voice-driven interface is one of an optical link and a radio frequency link.

3. The device, as set forth in claim 1, wherein said handset is detachable from the handheld unit and includes a formed support for carrying said handset by a user's ear in hands-free operation.

4. The device, as set forth in claim 3, wherein said formed-support is a flexible loop configured for partially surrounding the base of a user's ear.

5. The device, as set forth in claim 1, wherein said handset further comprises an image scanner.

6. The device, as set forth in claim 5, wherein said handset further includes a rotatable joint for adjustably carrying said image scanner and scanning in a plurality of directions relative to said handheld unit.

7. The device, as set forth in claim 1, wherein the handheld unit further comprises means for communicating with a remote location.

8. The device, as set forth in claim 7, wherein said means for communicating with a remote location is at least one of means for wireless communication and means for wired communication.

9. The device, as set forth in claim 8, wherein said means for wireless communications is at least one of means for cellular communication and means for satellite communication.

10. The device, as set forth in claim 8, wherein said means for wired communication is means for telecommunication.

11. A communication device comprising:
- a handheld unit having a wireless communication circuit for communicating with remote locations;
- a handset having voice input and voice output;
- a mechanism for docking said handset with said handheld unit forming a docked unit, said docked unit dimensioned to be held in one hand while being used for voice input and voice output; and
- at least one connection for carrying voice-representative signals between said handheld unit and said handset, both when said handset is docked with said handheld unit and when said handset is separate from said handheld unit.

12. The device, as set forth in claim 11, wherein said handset includes a rechargeable handset power-source, said handheld unit further including means to recharge said handset power-source when said handset is docked with said handheld unit.

13. The device, as set forth in claim 11, wherein said connection for carrying voice-representative signals is one of an optical link, a radio frequency link and a wired cable.

14. The device, as set forth in claim 11, wherein said handset includes a formed support for carrying said handset by a user's ear in hands-free headset operation.

15. The device, as set forth in claim 14, wherein said formed-support is a flexible loop configured for partially surrounding the base of a user's ear.

16. A handheld computing and communication device, including:
- a handheld unit including a processor and a display communicating with said processor;
- a card-shaped peripheral that communicates with remote locations, said handheld unit having a slot for accepting said card-shaped peripheral;
- a handset including means for voice input and means for voice output;
- a mechanism for docking said handset with said handheld unit forming a docked unit, said docked unit dimensioned to be held in one hand while being used for voice input and voice output;
- at least one connection for carrying voice-representative signals between said handheld unit and said handset, and said card-shaped peripheral carrying at least one of said connection for carrying voice-representative signals and said mechanism for docking said handset to said handheld unit.

17. The device, as set forth in claim 16, wherein said connection for carrying voice-representative signals is one of an optical link, a radio frequency link and a wired cable.

18. The device, as set forth in claim 16, wherein said card-shaped peripheral communicates with a remote location by at least one of means for wireless communication and means for wired communication.

19. The device, as set forth in claim 18, wherein said means for wireless communications is at least one of means for cellular communication and means for satellite communication.

20. The device, as set forth in claim 18, wherein said means for wired communication is means for telecommunication.

21. The device, as set forth in claim 16, wherein said card-shaped peripheral includes an image scanner.

22. The device as set forth in claim 21, wherein said handset further includes a rotatable joint for adjustably carrying said image scanner and scanning in a plurality of directions relative to said handheld unit.

23. A handset adapted to be removably attached to a handheld host computer of the type having connection for peripherals, the handset comprising:
- a microphone for voice input and a speaker for voice output;
- a mechanism for docking said handset with said handheld computer forming a docked unit, said docked unit dimensioned to be held in one hand while being used for voice input and voice output; and
- at least one wireless connection for carrying voice-representative signals between said handset and said handheld computer, both when said handset is docked with said handheld computer and when said handset is separate from said handheld computer.

24. The device, as set forth in claim 23, wherein said wireless connection for carrying voice-representative signals is one of an optical link and a radio frequency link.

25. The device, as set forth in claim 23, wherein said handset includes a formed support for carrying said handset by a user's ear in hands-free operation.

26. The device, as set forth in claim 25, wherein said formed-support is a flexible loop configured for partially surrounding the base of a user's ear.

* * * * *